United States Patent [19]
Taylor et al.

[11] Patent Number: 5,977,492
[45] Date of Patent: Nov. 2, 1999

[54] DUAL POWER SOURCE RETROFIT KIT WITH POWER SOURCE SELECTION INTERLOCK ASSEMBLY

[75] Inventors: John P. Taylor, Lexington; Terry A. Cassity, Paris, both of Ky.; Kenneth L. Uhlman, Moon, Pa.

[73] Assignee: Square D Company, Palatine, Ill.

[21] Appl. No.: 08/985,582

[22] Filed: Dec. 5, 1997

[51] Int. Cl.⁶ ........................................ H01H 9/20
[52] U.S. Cl. ........................ 200/50.32; 200/50.33
[58] Field of Search .................... 20/50.32–50.4, 20/43.16–43.22

[56] References Cited

U.S. PATENT DOCUMENTS

| | | | |
|---|---|---|---|
| 2,647,964 | 8/1953 | Merkel | 200/50.32 |
| 2,929,002 | 3/1960 | Wurgler | 200/50.38 |
| 3,432,628 | 3/1969 | Puetz | 200/50.35 |
| 3,801,758 | 4/1974 | Shand et al. | 200/50.33 |
| 4,924,041 | 5/1990 | Yee | 200/50.33 |
| 5,008,499 | 4/1991 | Yee et al. | 200/50.33 |
| 5,393,942 | 2/1995 | Reiner et al. | 200/50.4 |
| 5,648,646 | 7/1997 | Flegel | 200/50.32 |

OTHER PUBLICATIONS

Square D Catalog, 3 pp., Jan. 1996.

*Primary Examiner*—J. R. Scott
*Attorney, Agent, or Firm*—David R. Stacey; Larry T. Shrout; Larry E. Golden

[57] ABSTRACT

A dual power source retrofit kit for a single power source service entrance panel. The retrofit kit is a field installable kit for retrofitting a single power source service entrance panel to a dual power source service entrance panel. The kit includes a power source selection assembly and a mounting bracket for attaching to the service entrance panel. A dead-front trim plate having a cut-out to accept the power source selection assembly is also supplied to replace the old trim plate of the service entrance panel. The power source selection assembly permits only the selected one of the primary or auxiliary power sources to provide power to the service entrance panel at any one time. The power source selection assembly is also designed such that overload protection devices/disconnect switches for both the primary power source and the auxiliary power source must be in the OFF position before switching from one power source to the other is permitted.

18 Claims, 6 Drawing Sheets

DUAL POWER SOURCE RETROFIT KIT WITH POWER SOURCE SELECTION INTERLOCK ASSEMBLY

FIELD OF THE INVENTION

The present invention relates to the field of service entrance panels and specifically to a kit for retrofitting a standard single power source service entrance panel to a dual power source service entrance panel.

BACKGROUND OF THE INVENTION

It is known to use a sub-panel, mounted adjacent the main service panel, to add a second power source for designated circuits in the event power from the utility company is disrupted. The sub-panel includes a primary breaker or disconnect switch which receives power from the main service panel and an auxiliary breaker or disconnect switch for receiving power provided by an auxiliary power source, such as a generator. The primary and auxiliary breakers are generally arranged in tandem such that a bar or linkage connecting the operating mechanisms of the two breakers will operate both simultaneously. The breakers are also generally positioned such that either the ON or the OFF positions of both breakers are immediately adjacent one another thus permitting only one breaker to be ON at a time. Devices such as this are taught in U.S. Pat. No. 5,648,646 to Flegel, which issued Jul. 15, 1997, and in a brochure describing the manual transfer panels manufactured by Eylander Electric of Everett, Washington. The assignee of the present invention also manufactures manual transfer sub-panels of a similar design which are sold under Square D Catalog Numbers QO4-8M30DSGP and QO4-8M60DSGP.

SUMMARY OF THE INVENTION

The present invention provides a field installable kit for retrofitting a single power source service entrance panel to a dual power source service entrance panel. The kit includes a deadfront trim plate to replace the old trim plate of the service entrance panel, a power source selection assembly and a mounting bracket. Installation of the retrofit kit requires the removal of the old deadfront trim plate, installing an auxiliary power source breaker/disconnect switch in a breaker position immediately adjacent the service entrance main breaker, securing the mounting bracket to the service entrance panel, securing the power source selection assembly to the mounting bracket and installing the retrofit deadfront trim plate. The power source selection assembly selectively permits only the selected one of the primary or auxiliary power sources to provide power to the service entrance panel. The power source selection assembly is also designed such that overload protection devices/disconnect switches for both the primary power source and the auxiliary power source must be in the OFF position before switching from one power source to the other is permitted.

Other features and advantages of the invention will be apparent from the following specification taken in conjunction with the accompanying drawings in which there is shown a preferred embodiment of the invention. Reference is made to the claims for interpreting the full scope of the invention which is not necessarily represented by such embodiment. Also, it is to be understood that the phraseology and terminology used herein is for the purpose of description and should not be regarded as limiting.

DESCRIPTION OF THE PREFERRED EMBODIMENT

Figure 1:
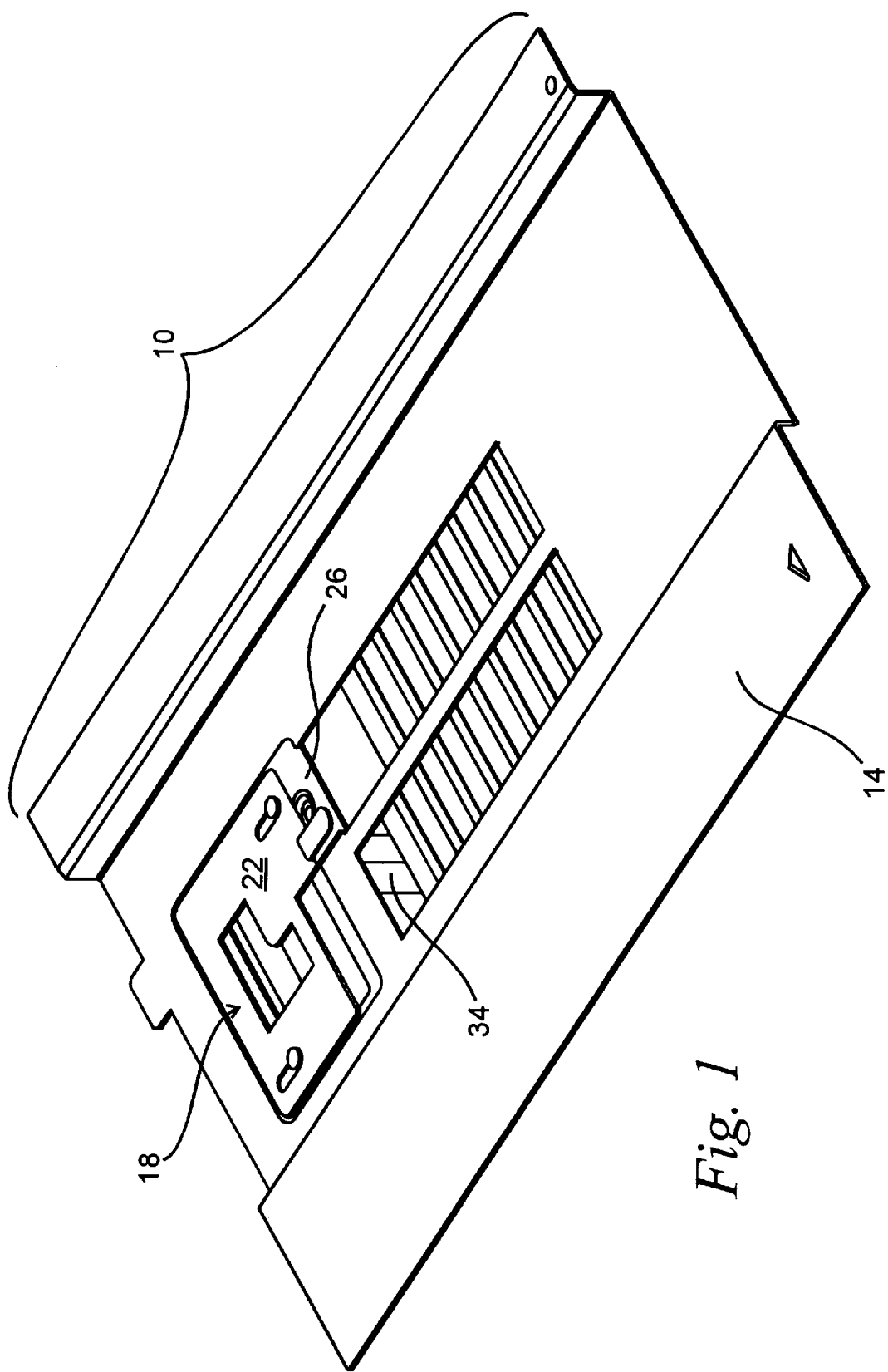
FIG. 1 is an isometric view of the dual power source retrofit kit in accordance with the present invention.

FIG. 1 illustrates a dual power source retrofit kit for a center mounted main service entrance panel in accordance with the present invention and generally indicated by reference numeral 10. The dual power source retrofit kit 10 includes a panel trim plate 14, which replaces the trim plate of the service entrance panel being converted, a power source selector assembly 18 which consists of a selector plate 22 slidably attached to a hold down plate 26 by shoulder rivets 30 and a mounting bracket 34 for attaching the selector assembly 18 to the service entrance panel.

Figure 2:
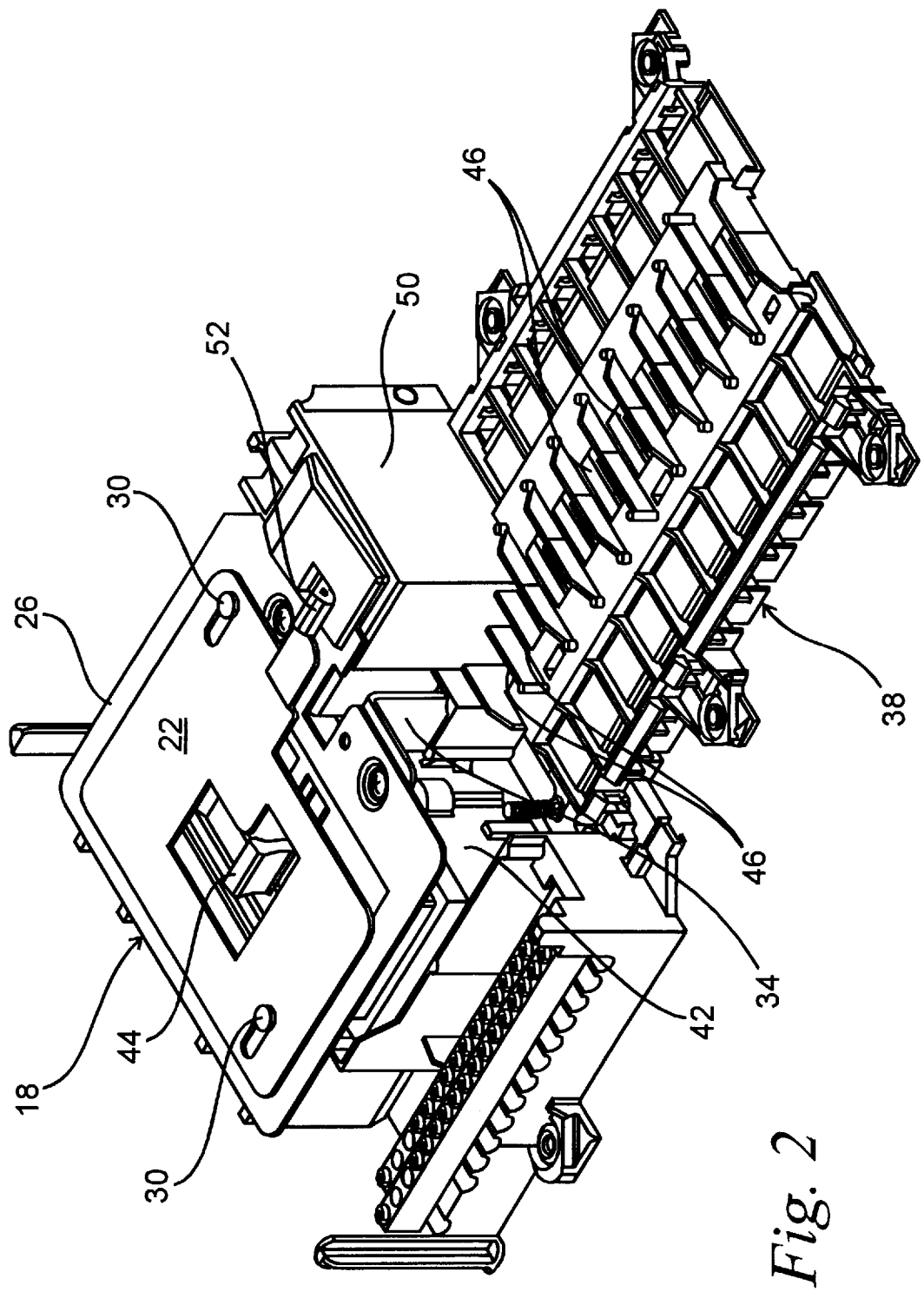
FIG. 2 is an isometric view of a service entrance panel base including main power breaker and auxiliary power breaker with a power source selector in accordance with the present invention.

FIG. 2 illustrates the power selector assembly 18, installed on a base assembly 38 of a service entrance panel. Most service entrance panels have a two pole center mounted main breaker 42 (the main breaker is centered generally on the vertical center line of the service entrance panel) and located at the top of the base assembly 38. Although uncommon, some service entrance panels have the main breaker 42 located at the bottom of the base assembly 38. The dual power source retrofit kit 10 of the present invention will function with the main breaker 42 in either position. For the purpose of the following discussion the main breaker 42 will be located at the top of the base assembly 38 as shown in FIG. 2. The main breaker 42, which has its line side terminals connected to the electric utility service, is selectively movable between ON and OFF positions by an operating handle 44 and acts as an over current protection device and disconnect switch for the service entrance panel. Each of the two load side terminals of the main breaker 42, are connected to a bus bar which is enclosed within, and supported by the base assembly 38. A 110 VAC power source is provided between each bus bar and neutral and a 220 VAC power source is provided between the two bus bars. The base assembly 38 defines a number of branch breaker slots 46 for receiving the line side connectors of branch line breakers installed in the service entrance panel. The breaker slots 46 are positioned along the center line of the base assembly 38 between the two bus bars such that each breaker slot 46 provides access to one of the two bus bars, and further such that adjacent breaker slots 46 alternately between the two bus bars. The auxiliary power source feeds the service entrance panel by means of a two pole auxiliary main breaker 50. The auxiliary main breaker 50 receives power from the auxiliary power source through its load terminals and selectively back-feeds the service entrance panel through its two bus bar connectors 54 (FIGS.

5 and 6) each of which plug onto one of the two bus bars through two adjacent breaker slots 46. The auxiliary main breaker 50 back-feeds the service entrance panel only when its operating handle 52 is in the ON position.

Figure 3:
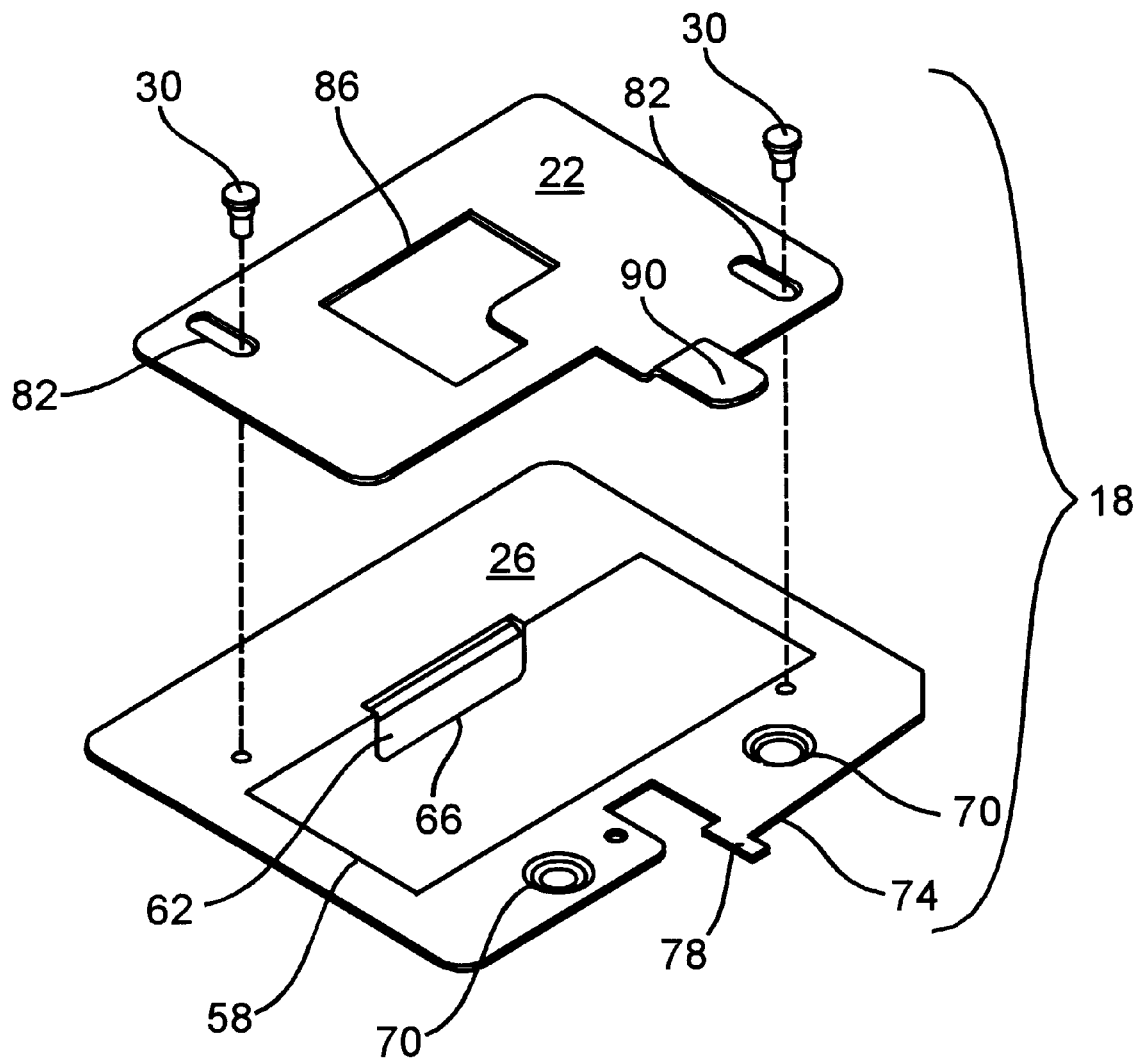
FIG. 3 is an exploded view of the power source selector plate assembly of the present invention.

Referring now to FIG. 3, the power selection assembly 18 is shown in an exploded view. The hold down plate 26 is generally flat and rectangular in shape and defines a generally rectangular opening 58. The rectangular opening 58 is dimensioned to snugly receive a top portion of the main breaker 42. A turned down flange 62 is formed along one side of the rectangular opening 58. The flange 62 maintains proper alignment between the hold down plate 26 and the main breaker 42 and also provides support for the hold down plate 26 as a distal end 66 of the flange 62 rests on a portion of the main breaker 42. Two recessed holes 70 are provided in hold down plate 26 between the rectangular opening 58 and a side 74 of the hold down plate 26. A generally rectangular shaped tab 78 extends outwardly from the approximate mid-point of side 74. The selector plate 22 is provided with two slots 82 having a parallel longitudinal axes for receiving the shoulder rivets 30 which permit the selector plate 22 to be slidably attached to the hold down plate 26 such that it can be selectively moved between a first position wherein power is selectively provided by the main breaker 42 and a second position wherein power is selectively provided by the auxiliary main breaker 50. The selector plate 22 also defines an L-shaped opening 86 which is positioned to coincide with the rectangular opening 58 of the hold down plate 26. The selector plate 22 includes a generally rectangular tab 90 extending outward from one side of the selector plate 22 such that its longitudinal axis is generally parallel to the longitudinal axes of the two slots 82. Thus the tab 90 will move back and forth along its longitudinal axis as the selector plate 22 is selectively moved between its first and second positions.

Figure 4:
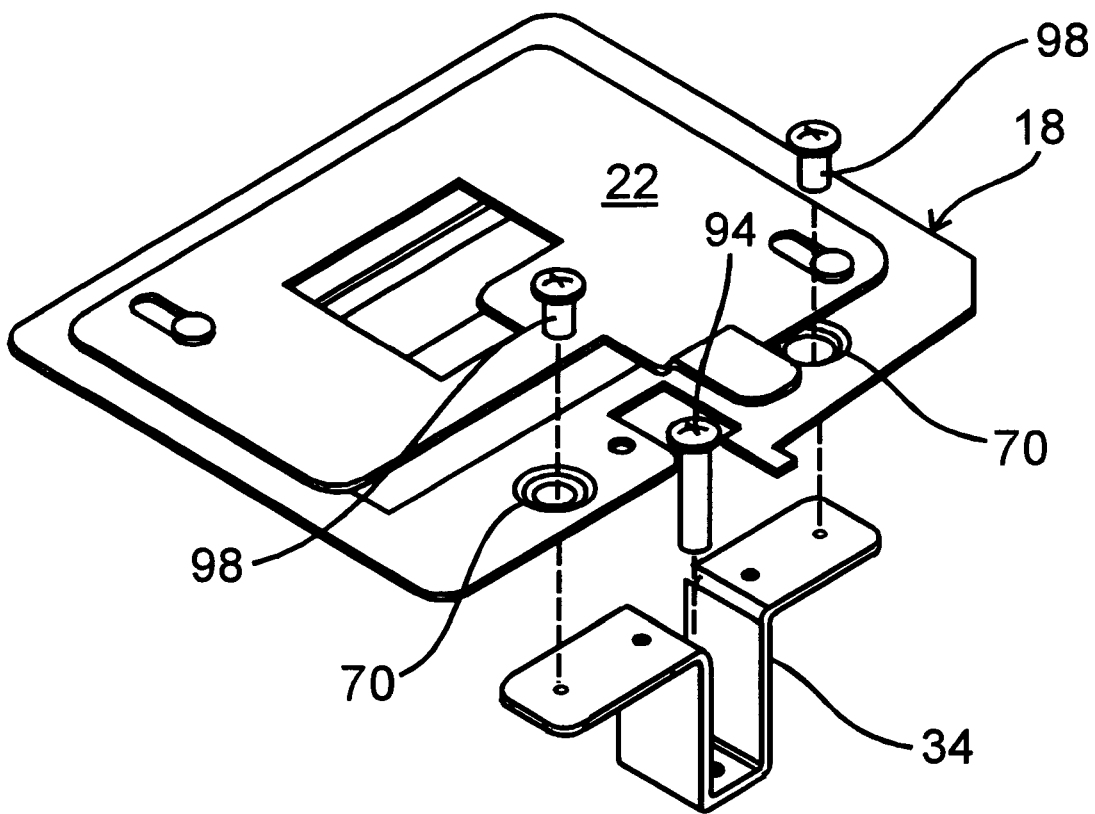
FIG. 4 is an exploded view of the power source selector plate assembly and attaching bracket of the present invention.

Referring now to FIG. 4, the selector assembly 18 is shown with the mounting bracket 34. The mounting bracket 34 is attached to the service entrance panel by a screw 94 which passes through the base assembly 38. Two rivets or screws 98 are used to attach the selector assembly 18 to the mounting bracket 34. The heads of the rivets or screws 98 are received in the recessed holes 70 (see FIGS. 2, 5 and 6) such that they will not interfere with the sliding movement of the selector plate 22.

Figure 5:
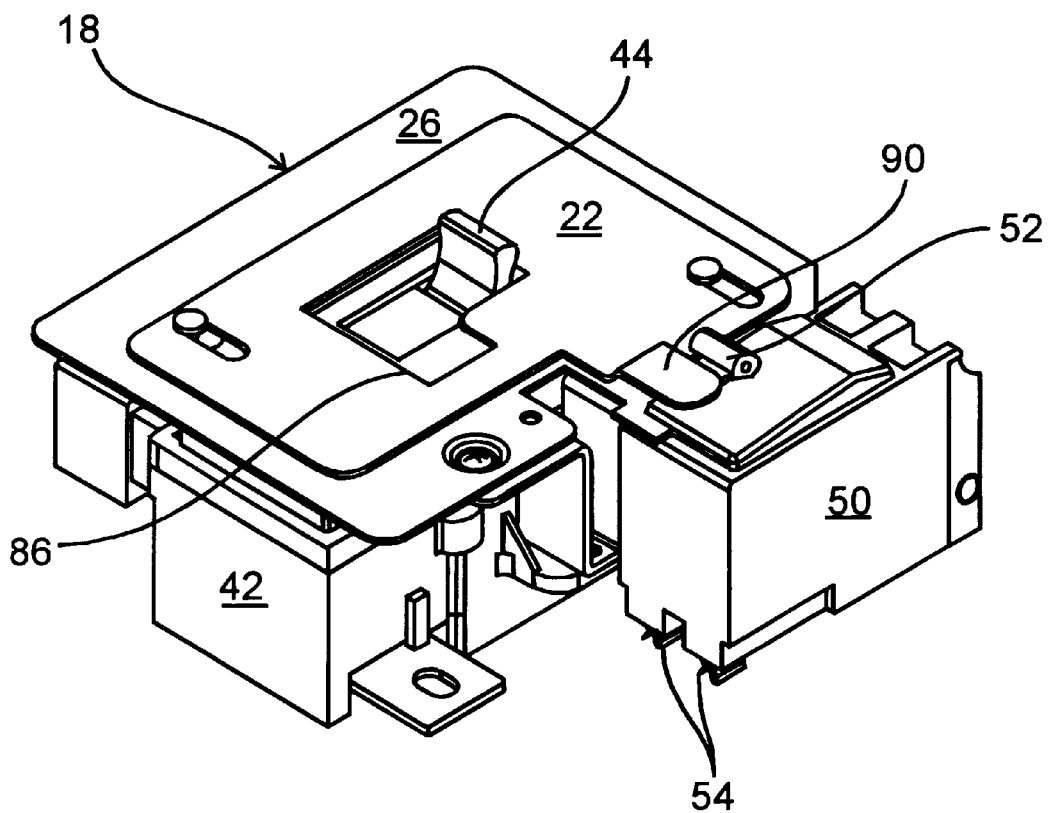
FIG. 5 is an isometric view of the power source selector plate with the center mounted main breaker in the ON position and the auxiliary main breaker in the OFF position.

FIG. 5 illustrates an installed selector assembly 18 with the selector plate 22 in the first position such that the main breaker 42 is selectively providing power to the service entrance panel and the auxiliary main breaker 50 is maintained in the OFF position. In this position the L-shaped opening 86 is positioned such that the main breaker handle 44, shown in the ON position, can be selectively moved between the ON and OFF positions while the auxiliary main breaker handle 52 is forced to remain in the OFF position by the rectangular tab 90 of the selector plate 22.

Figure 6:
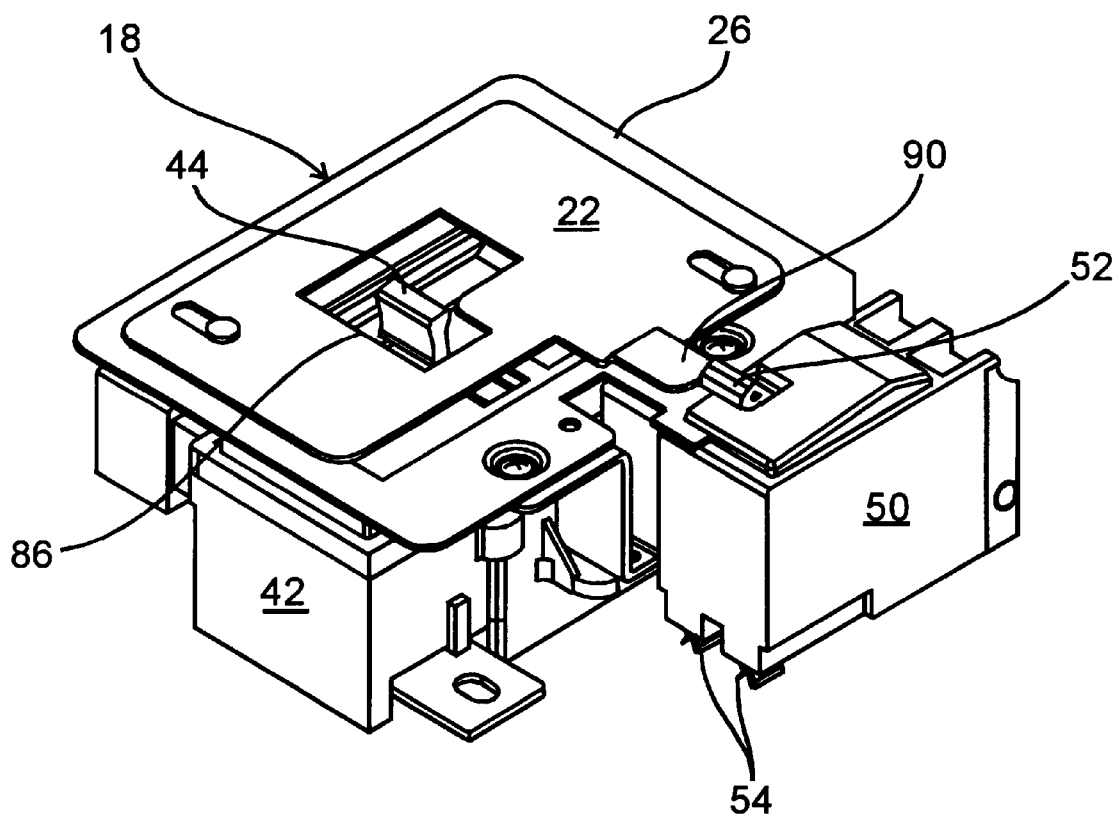
FIG. 6 is an isometric view of the power source selector plate with the center mounted main breaker in the OFF position and the auxiliary main breaker in the ON position.

FIG. 6 illustrates an installed selector assembly 18 with the selector plate 22 in the second position such that the auxiliary main breaker 50 is selectively providing power to the service entrance panel and the main breaker 42 is maintained in the OFF position. In this position the L-shaped opening 86 is positioned such that the main breaker handle 44, shown in the OFF position, is blocked by the L-shaped opening 86 such that it can not be selectively moved to the ON positions while the auxiliary main breaker handle 52 is no longer blocked by the rectangular tab 90 and can be selectively moved between the ON and OFF positions.

The process of converting a single power source service entrance panel to a dual power source service entrance panel using the retrofit kit 10 of the present invention requires the removal of the old trim plate and the installing of a two pole auxiliary main breaker 50 of adequate amperage rating in the appropriate branch breaker slots 46 immediately adjacent the main breaker 50. The auxiliary main breaker 50 must be properly installed on the base assembly 38 prior to installing the power selector assembly 18. The mounting bracket 34 is then positioned on the base assembly 38 and attached to the service entrance panel by the screw 94. The power selector assembly 18 is then positioned such that the top of main breaker 42 is received in the rectangular opening 58 of the hold down plate 26 and the tab 78 and adjacent portion of side 74 of the hold down plate 26 overlap a portion of the upper surface of the auxiliary main breaker 50. The power selector assembly 18 is then secured to the mounting bracket 34 by rivets or screws 98. The power selector assembly 18 and mounting bracket 34 can be preassembled to facilitate the installation process. The power selector assembly 18 must be properly installed to meet the requirements of Paragraph 384–16(f) of the 1993 National Electric Code which requires that a back-fed main breaker, such as auxiliary main breaker 42, must be secured such that it can not be removed from the bus bar with just a pull. When the power selector assembly 18 is properly installed the tab 78 and a portion of side 74 immediately adjacent the tab 78 will engage an upper surface of the auxiliary main breaker 50 as shown in FIG. 2. This engagement between the tab 70 and adjacent portion of side 74 with the auxiliary main breaker 42 secures the auxiliary main breaker 50 to the base assembly 38 such that it can not be removed from the base assembly 38 without using a tool.

Modifications can be made to the selector plate 22 to accommodate various orientations of the main breaker 42 and auxiliary main breaker 50 while maintaining the two position operation of the power selector assembly 18 and back-feed main breaker hold down features required in Paragraph 384–16(f) of the 1993 National Electric Code.

It is also within the scope of this invention that the L-shape opening 86 and tab 90 of the selector plate 22 can take other forms as long as those forms provide two switch operator blocking devices which are simultaneously movable between two positions in which one switch is prevented from being The selector plate 18 is selectively movable between a first position in which power is provided to the distribution panel through the primary main breaker 42 and a second position in which power is provided to the distribution panel through the auxiliary main breaker 50. Only one of the main breaker or auxiliary main breaker can be "ON" or providing power to the distribution panel at a time.

We claim:

1. A dual power source retrofit kit for a single power source service entrance panel having a center mounted main breaker providing primary power to the service entrance panel, said retrofit kit comprising:

an auxiliary main breaker for connecting the service entrance panel to an auxiliary power source;

a mounting bracket adapted to be attached to the service entrance panel;

a hold-down plate attached to said mounting bracket, said hold-down plate generally encircling the center mounted main breaker and a portion of said auxiliary main breaker;

a power source selector plate being slidably attached to said hold-down plate such that said power source selector plate is movable between a first position in which the center mounted main breaker is selectively ON and said auxiliary main breaker is OFF and a second position in which the center mounted main breaker is OFF and said auxiliary main breaker is selectively ON.

2. The retrofit kit of claim 1 wherein said mounting bracket is secured to the service entrance panel by a threaded fastener.

3. The retrofit kit of claim 1 wherein said hold-down plate is generally flat and rectangular in shape and defines a generally rectangular opening which snugly receives the center mounted main breaker, said hold-down plate further defines a tab extending outwardly from one side such that said tab and an immediately adjacent portion of said side overlap a portion of said auxiliary main breaker.

4. The retrofit kit of claim 3 wherein said hold-down plate also defines a flange along one side of said rectangular opening, said flange being generally perpendicular to said hold-down plate and having a distal end, said flange being dimensioned such that said distal end engages a portion of the center mounted main breaker when said hold-down plate is properly attached to said mounting bracket, thereby providing support to said hold-down plate.

5. The retrofit kit of claim 1 wherein said hold-down plate is secured to said mounting bracket such that said auxiliary main breaker can not be removed from said service entrance panel without first removing said hold-down plate.

6. The retrofit kit of claim 1 wherein said power selector plate defines at least one operator opening for receiving an operating handle of the center mounted main breaker and means for selectively preventing an operating handle of said auxiliary main breaker from being placed in the ON position when said selector plate is in said first position.

7. The retrofit kit of claim 6 wherein said at least one operator opening is configured such that when said power selector plate is in said first position the operating handle of the center mounted main breaker can be selectively moved between it's ON and OFF positions and when said selector plate is in said second position the operating handle of the center mounted main breaker must be in the OFF position.

8. The retrofit kit of claim 6 wherein said means for selectively preventing said operating handle of said auxiliary main breaker from being placed in the ON position is a blocking tab, said blocking tab extending generally outward from said power selector plate such that as said power selector plate is moved between said first and second positions said blocking tab moves back and forth along it's longitudinal axis.

9. The retrofit kit of claim 8 wherein the length of said blocking tab is determined by the linear distance between said first and second positions said power selector plate.

10. The retrofit kit of claim 1 wherein said selector plate can only be moved between said first and second positions when both the center mounted main breaker and said auxiliary main breaker are in their respective OFF positions.

11. The retrofit kit of claim 1 wherein said retrofit kit further includes a deadfront trim plate for covering the exposed live parts of the service entrance panel.

12. A dual power source retrofit kit for a single power source service entrance panel having a center mounted main breaker for providing primary power to the service entrance panel, said retrofit kit comprising:

an auxiliary main breaker for connecting the service entrance panel to an auxiliary power source;

a power source selector assembly attached to the service entrance panel such that said power source selector assembly secures both the center mounted main breaker and said auxiliary main breaker in the service entrance panel, said power source selector assembly having a power source selector plate being slidably movable between a first position in which the center mounted main breaker is selectively ON and said auxiliary main breaker is OFF and a second position in which the center mounted main breaker is OFF and said auxiliary main breaker is selectively ON.

13. The retrofit kit of claim 12 wherein said power source selector assembly further includes a hold-down plate being generally flat and rectangular in shape and defining a generally rectangular opening for snugly receiving the center mounted main breaker, said hold-down plate further defining a tab extending outwardly from one side such that said tab and an immediately adjacent portion of said side overlap a portion of said auxiliary main breaker.

14. The retrofit kit of claim 12 wherein said power selector plate defines at least one operator opening for receiving an operating handle of the center mounted main breaker and means for selectively preventing an operating handle of said auxiliary main breaker from being placed in the ON position when the operating handle of the center mounted main breaker is in the ON position.

15. The retrofit kit of claim 14 wherein said means for selectively preventing said operating handle of said auxiliary main breaker from being placed in the ON position is a blocking tab, said blocking tab extending generally outward from said power selector plate such that as said power selector plate is moved between said first and second positions said blocking tab moves back and forth along it's longitudinal axis.

16. The retrofit kit of claim 12 wherein said selector plate can only be moved between said first and second positions when both the center mounted main breaker and said auxiliary main breaker are in their respective OFF positions.

17. The retrofit kit of claim 12 wherein said retrofit kit further includes a deadfront trim plate for covering the exposed live parts of the service entrance panel.

18. A dual power source retrofit kit for a single power source service entrance panel having a center mounted main breaker providing primary power to the service entrance panel, said retrofit kit comprising:

an auxiliary main breaker for connecting the service entrance panel to an auxiliary power source, said auxiliary main breaker being located adjacent to but not in tandem with the center mounted main breaker;

a mounting bracket adapted to be attached to the service entrance panel;

a hold-down plate attachable to said mounting bracket, said hold-down plate generally encircling the center mounted main breaker and a portion of said auxiliary breaker such that the main breaker and said auxiliary breaker can not be removed from the service entrance panel without removing said hold-down plate;

a power source selector plate being slidably attached to said hold-down plate such that said power source selector plate is movable between a first position in which the center mounted main breaker is selectively ON and said auxiliary main breaker is OFF and a second position in which the center mounted main breaker is OFF and auxiliary main breaker is selectively ON.

* * * * *